United States Patent Office 3,471,329
Patented Oct. 7, 1969

3,471,329
PROCESS FOR THE TECHNICAL SEPARATION OF SUGAR MIXTURES
Herbert Quietensky and Ernst Nitsch, Linz, Austria, assignors to Laevosan-Gesellschaft Chem. Pharm. Industrie Frank & Dr. Freudl, Linz, Austria, a corporation of Austria
No Drawing. Filed Mar. 27, 1967, Ser. No. 625,946
Claims priority, application Austria, Mar. 30, 1966, A 3,002/66
Int. Cl. C13d 1/14
U.S. Cl. 127—46          10 Claims

ABSTRACT OF THE DISCLOSURE

A process for separating the individual sugar components which together form a mixture of sugars from the mixture by contacting an aqueous-alcoholic solution of said mixture of sugars with a hydrazine-loaded cation exchange resin whereby the sugar is removed from the solution, and then washing the sugar-containing resin to obtain the individual sugar components of the original mixture in wash fractions.

BACKGROUND OF THE INVENTION

Natural sources of sugar provide mixtures containing several different species which fall under the generic classification of sugars. The individual species found in a given natural sugar mixture and the relative proportions of each are in part dependent upon the natural product from which the sugar is obtained, and upon the process utilized. Sugars obtained as a result of synthetic processes often contain two or more different species of sugar. The commonest example of a mixture of natural sugars is the well known invert sugar composed of glucose and fructose.

The literature discloses many processes for separating the individual sugars from sugar mixtures. This has been the subject of classical chemical analysis. On a production scale, the separatory methods are largely divided into two types. In one well known group of methods, the sugars of the mixture are first converted into their derivatives, which are then separated, e.g., by fractional crystallization or the like. The other well known group of separatory processes utilize the difference in the rate of adsorption or the different intensity of adsorption on solid materials, or some other difference in the physical properties of the individual sugars, directly, rather than utilizing differences in physical properties of their derivatives as in the first group of processes referred to hereinbefore.

Although the group of processes utilizing the derivatives may appear more complicated, in practice it has been found that better quantitative separations are more easily obtained than are the separations utilizing the sugars directly. This follows from the fact that the differences in the physical properties of the individual sugars are very small, whereas the differences in properties of their derivatives are greater. Thus, although the processes utilizing the deviratives of the sugar requires the additional process step of forming the derivative and subsequently breaking it, the overall processes are more economic and result in the production of better products.

Recently processes utilizing differences in the individual sugars have become more favorable. These processes are generally based on the fact that the different sugars may be separated by fractional adsorption on ion exchange resins. The ion exchange resins may also be present in the form of their salts. No chemical reaction takes place between the ion exchange resin and the sugars. Although these new processes present advantages when compared with the earlier processes, they have the disadvantage that efficient separation requires relatively long columns and large volumes of exchange material.

SUMMARY OF THE INVENTION

The present invention provides an efficient process for the separation of the individual sugars which together form a mixture of sugars, by reacting a cation exchange resin with hydrazine. The hydrazine compound becomes bonded to the active acidic group of the cation exchange resin, said resin being a porous insoluble support material having active acidic groups. An aqueous or an aqueous-alcoholic solution of the mixture of sugars is then contacted with the hydrazine-loaded exchange resin. The sugars are removed from the solution and become bonded to the hydrazine. The individual sugars are then obtained by washing the sugar-containing cation exchange resin to fractionate the sugars and obtain the individual sugars present in said sugar mixture, in the separate wash fractions.

The foregoing separation is based on the utilization of the different rates of formation of sugar derivatives, or the different hydrolytic stability of these sugar derivatives. These sugar derivatives are the hydrazones of the individual sugars originally in the mixture of the sugars.

The separation process of the present invention may be more broadly described as one in which sugars are separated from a mixture of sugars by contacting an aqueous or an aqueous-alcoholic solution of the mixture of sugars with an insoluble support material containing active groups which have been reacted with a compound which is then able to form a hydrozone bond with a sugar molecule. All of the sugar is then removed from the solution by the hydrozone-type reaction with the loaded cation exchange resin. The sugars are then washed from the resin. The washing results in a fractionation, with the different sugar species coming off in predominantly different fractions. The fractionation results from the different degree of hydrolytic stability between the sugar-hydrazine and its hydrolysis products.

DESCRIPTION OF THE PREFERRED EMBODIMENTS

The cation exchange resins useful in the present invention are those which are substantially insoluble in the water or water-alcohol solutions used. They are polymeric materials and contain active acidic groups. To obtain the maximum surface area and the maximum number of active groups to efficiently utilize the process, it is preferred that the exchange resin should be porous and be in the form of relatively small particles. The porosity permits diffusion of the sugar solutions into the interiors (center) of the particles. Suitable resins that meet the criteria necessary for this process are illustrated by the widely available and economic polystyrene resins, and phenolic (generally phenolformaldehyde) resins.

The preferred cation exchange resins are those which contain highly acid active groups. These include sulfate groups, carboxy groups, and phosphite groups. Hydrazine will react with the active group on the resin, and is still able to react with sugars to form compounds corresponding to the sugar hydrazones as aforesaid. Hydrazine and equivalent functioning hydrazine derivatives are useful in the process of this invention.

It has been found that the effectiveness of the separation is substantially improved and that the necessary volume of wash water may be reduced, if the resin is only partially loaded with hydrazine ions, and also contains H+ ions. Preferably, the hydrogen ions are in approximately equal molar amounts with the hydrazine. The preferred procedure for preparing this resin loaded with hydrazine and H+ ions is to treat the cation exchange resin with a strong acid such as hydrochloric acid, to convert all of the active group to the acidic form. The resin is then thoroughly washed and all the hydrochloric acid removed. Hydrazine is then reacted with the acidic resin; the amount of hydrazine used being only about half the molar amount necessary to react with all the active acidic groups.

The present invention is useful for separating individual sugars commonly found in sugar mixtures. It is most usefully applied to the very common mixture of glucose and fructose known as invert sugar. The examples furnish additional illustrative sugar mixtures which are separated into their individual component sugars.

The process is carried out in a column packed with the resin. The aqueous solution of the sugars, or the aqueous-alcoholic solution of the sugars, is contacted with sufficient of the loaded cation exchange resin to remove all the sugar from the solution. The column is then washed. The first washing usually produces a fore-run which contains substantially no sugar. Individual relatively small fractions are then taken from the subsequent washings, as described in more detail in the examples. The different sugars in the original mixture are heavily concentrated in different fractions. The fractions may be concentrated by distilling off the water. The sugar may be crystallized from the washing liquid or from a suitable solvent. The mother liquors may be recycled to the feed, resulting in a substantially 100% yield. The process may be carried out in a cyclic manner.

The temperautre utilized during the process is of importance since the reaction rates and the position of the hydrolytic equilibrium are dependent upon it. For the separation of the components of invert sugar using hydrazine, the process is preferably carried out at temperatures between 40° C. and 80° C., with 65° C. being the optimum. As is apparent, the specific temperautre utilized during the separation will be dependent upon the specific mixture of sugars and the components thereof. Thus, dependent upon the sugar and the hydrazine, the separation may be carried out at the ambient temperatures, low temperatures, or high temperatures. In certain situations, the use of stepwise or constantly increasing temperatures is preferred.

EXAMPLES

The following examples illustrate the invention.

Example 1.—Separation of glucose and fructose from invert sugar using a hydrazine saturated cation exchange resin Into a glass tube having a 33 mm. bore and 2 m. length, are placed 1.6 liter of cation exchange resin Duolite C 27 (porous polystyrene resin having a particle size 70.3–1.2 mm. and $SO_3H$ as the active groups, with a total capacity of 1.7 mval./ml. moistened), supplied by Firma Benckser, Ludwigshafen (Rhine). Hydrochloric acid in the H+ form is passed through the column. Then a bimolar solution of hydrazine, until an alkaline effluent appears. The column is then washed neutral with water. The temperature of the column is maintained at 65° C. by a heating jacket with pumped circulating water controlled by a thermostat. The inlet to the column is heated in the same manner. By means of a metering pump there is fed into the head of the column, 460 ml. invert sugar solution 50% w./v., corresponding to 115 g. of glucose, and of fructose, at a rate of 15.5 ml./min. It is then washed with distilled water at the same rate. A sugar free first-run of 720 ml. appears, and is rejected. The following fractions each of 160 ml. (=1/10 of the column volume) are collected separately and the sugars collected therein were determined by optical rotation and refraction.

| Fraction No. | Total amount of sugar, percent | Fructose, percent | Glucose percent |
|---|---|---|---|
| 1 | 7.9 | 7.0 | 0.9 |
| 2 | 24.1 | 23.5 | 0.6 |
| 3 | 29.0 | 25.0 | 4.0 |
| 4 | 17.7 | 12.25 | 5.5 |
| 5 | 11.2 | 3.2 | 8.0 |
| 6 | 9.3 | 0.7 | 8.5 |
| 7 | 8.1 | 0.1 | 8.0 |
| 8 | 7.0 | 0.05 | 7.0 |
| 9 | 5.9 | | 5.9 |
| 10 | 5.8 | | 5.8 |
| 11 | 3.9 | | 3.9 |
| 12 | 3.2 | | 3.2 |
| 13 | 2.8 | | 2.8 |
| 14 | 1.8 | | 1.8 |
| 15 | 1.1 | | 1.1 |

The fractions, 1 to 4, which contain the greatest quantity of fructose are combined, concentrated and crystallized from methanol in a conventional manner. Another crystallization is obtained from the mother liquor of the first crystallization. Both crystallisates, after washing with methanol, are pure white and consist of pure fructose. ($[\alpha]_D^{20}=-92°$, c.=10). Yield 65 g. The remaining mother liquor is only weakly coloured and can be returned to the process without any further treatment.

Likewise from fractions 5 to 15, 53 g. of pure glucose is obtained ($[\alpha]_D^{20}=+52.5°$, c.=10). The glucose mother liquor also can be returned to the process.

Example 2.—Separation of glucose and fructose from invert sugar with a cation exchange resin containing hydrazine and H+ ions In the column described in Example 1, 1.6 liters of Duolite C 27 are first regenerated with acid, then the resin which has been washed neutral, is emptied and stirred gently with a solution of 65 g. (=2 mol) of hydrazine in approximately 3 liters of water for half an hour. Approximately half of the acid groups contained in the resin are saturated with hydrazine. The remainder are in the H+ form. The column is again filled with the pretreated resin and brought to a temperature of 65° C. As in Example 1, 460 ml. of invert sugar solution 50% w./v. are added at a rate of 15.5 ml./min., and finally washed through at the same rate with water. A sugar-free fore-run of 845 ml. appears first. Fractions of 160 ml. are then obtained, and the sugars determined, with the following results:

| Fraction No. | Amount of total sugar, percent | Fructose, percent | Glucose percent |
|---|---|---|---|
| 1 | 9.2 | 8.5 | 0.7 |
| 2 | 25.9 | 24.5 | 1.4 |
| 3 | 29.0 | 25.4 | 3.6 |
| 4 | 25.4 | 11.8 | 13.6 |
| 5 | 20.5 | 1.0 | 19.5 |
| 6 | 15.1 | | 15.1 |
| 7 | 9.3 | | 9.3 |
| 8 | 6.0 | | 6.0 |
| 9 | 3.3 | | 3.3 |
| 10 | 1.6 | | 1.6 |
| 11 | 0.4 | | 0.4 |
| 12 | 0.1 | | 0.1 |

As in Example 1, 75 grams of pure fructose is obtained from the fractions 1 to 3 by crystallization from methanol and recrystallization from the mother liquor, and 79 grams of pure glucose is obtained in a similar manner from fractions 4 to 12.

Example 3.—Separation of fructose and galactose on cation exchange resins which contain hydrazine and H+ ions The method and equipment of Example 2 is employed. 460 ml. of a solution containing 25% w./v. of fructose, and of galactose are added. After a sugar-free fore-run of 870 ml., fractions of 160 ml. (=1/10 column volume) are obtained, and the sugars determined, with the following results:

| Fraction No. | Total sugar, percent | Fructose, percent | Galactose, percent |
|---|---|---|---|
| 1 | 16.9 | 14.7 | 2.2 |
| 2 | 32.8 | 26.7 | 6.1 |
| 3 | 30.6 | 22.8 | 7.8 |
| 4 | 17.0 | 7.3 | 9.7 |
| 5 | 9.7 | 0.8 | 8.9 |
| 6 | 7.5 |  | 7.5 |
| 7 | 5.8 |  | 5.8 |
| 8 | 3.7 |  | 3.7 |
| 9 | 2.8 |  | 2.8 |
| 10 | 2.6 |  | 2.6 |
| 11 | 2.4 |  | 2.4 |
| 12 | 1.6 |  | 1.6 |
| 13 | 1.1 |  | 1.1 |
| 14 | 0.5 |  | 0.5 |
| 15 | 0.3 |  | 0.3 |

51 grams of pure fructose is obtained from fractions 1 to 3 by crystallization from methanol and post crystallization from the mother liquor as in Example 1. The fractions 4 to 15 give 66.5 grams of pure crystallized galactose ($[\alpha]_D^{20} = +79.5°$, c.=10).

Example 4.—Separation of sorbitol and glucose using cation exchange resin which contain hydrazine and H+ ions The method and equipment described in Example 2 is used. 460 ml. of a solution containing 25% w./v. of sorbitol, and of glucose are added. After a sugar-free fore-run of 805 ml., fractions of 160 ml., are obtained, and the sugars determined, with the following results:

| Fraction No. | Total sugar, percent | Sorbital percent | Glucose, percent |
|---|---|---|---|
| 1 | 10.1 | 10.1 |  |
| 2 | 24.5 | 24.5 |  |
| 3 | 25.1 | 23.6 | 1.5 |
| 4 | 11.4 | 8.8 | 2.6 |
| 5 | 16.8 | 1.6 | 15.2 |
| 6 | 22.4 |  | 22.4 |
| 7 | 16.7 |  | 16.7 |
| 8 | 10.8 |  | 10.8 |
| 9 | 7.1 |  | 7.1 |
| 10 | 4.7 |  | 4.7 |
| 11 | 2.5 |  | 2.5 |
| 12 | 1.8 |  | 1.8 |
| 13 | 1.0 |  | 1.0 |
| 14 | 0.7 |  | 0.7 |

87.3 grams of pure sorbitol ($[\alpha]_D^{20} = -2.0°$), are obtained from fractions 1 to 4 by crystallization from methanol and post-crystallization from the mother liquor as in Example 1. In a similar manner 85.3 grams of pure glucose are obtained from fractions 5 to 14.

Example 5.—Separation of glucose and fructose from invert sugar using a cation exchange resin, charged ½ with H+ ions and ½ with hydrazine ions at 40° C.

3 liters of cation exchange resin Duolite C 25 (a strongly acidic porous polystyrene resin having a particle size of 0.3–1.2 mm., SO₃H active groups, and a total capacity of 1.7 in val./ml.) is treated with hydrochloric acid in the H+ form in manner the manner described hereinbefore. The resin is washed neutral and is stirred with a solution of 81.5 g. (=2.55 mol) hydrazine in approximately 5 liters of water. The charged resin is placed in two glass tubes each with a 33 mm. bore and 2 m. long. These are connected in series, the bottom of the first tube being joined to the top of the second. The tubes are kept at a temperature of 40° C. by heating jacket. Following the procedure of Example 1, 500 ml. of invert sugar solution 50% w./w. (=62% w./v.) are added in a rate of 15.5 ml./min. and finally eluted with water at the same rate. A sugar-free force-run of approximately 1800 ml. is obtained first. Then fractions of 150 ml. are obtained and the sugars determined with the following results:

| Fraction No. | Total sugar, percent | Fructose, percent | Glucose, percent |
|---|---|---|---|
| 1 | 2.9 | 2.5 | 0.4 |
| 2 | 8.7 | 7.8 | 0.9 |
| 3 | 16.9 | 15.3 | 1.6 |
| 4 | 23.8 | 21.0 | 2.8 |
| 5 | 26.0 | 21.7 | 4.3 |
| 6 | 25.0 | 18.4 | 6.6 |
| 7 | 22.6 | 14.1 | 8.5 |
| 8 | 18.9 | 9.1 | 9.8 |
| 9 | 14.7 | 4.7 | 10.0 |
| 10 | 11.8 | 2.0 | 9.8 |
| 11 | 9.7 | 0.2 | 9.5 |
| 12 | 8.2 |  | 8.2 |
| 13 | 7.5 |  | 7.5 |
| 14 | 6.4 |  | 6.4 |
| 15 | 5.4 |  | 5.4 |
| 16 | 5.0 |  | 5.0 |
| 17 | 4.3 |  | 4.3 |
| 18 | 3.9 |  | 3.9 |
| 19 | 3.2 |  | 3.2 |
| 20 | 2.65 |  | 2.65 |
| 21 | 1.9 |  | 1.9 |

90.7 grams of pure fructose is obtained from fractions 1 to 7 by crystallization from methanol and post-crystallization of the mother liquid as in Example 1. Similarly 111.6 grams of pure glucose is obtained from fractions 8 to 21.

Example 6.—The separation of pure lactulose from lactulose-concentrates (a) Preparation of lactulose concentrate, modified in accordance with Montgomery: J. Am. Chem. Soc. 52, 2101/1930.—2000 g. of lactose are dissolved with rigorous stirring in 10 liters of saturated lime water (approximately 0.05 N) at 35° C. and the clear solution is kept at this temperature for 48 hours. The solution which is now brown coloured is freed from the bulk of the lime by introduction of carbon dioxide, and filtering, after the addition of activated carbon. It is then completely freed from salt over a mixed bed exchange resin. The now clear and colourless solution is evaporated to a syrup under vacuum. After standing for 24 hours, the bulk of the unchanged lactose crystallizes out. This is filtered off by suction and washed with a little water. The filtrate which contains a high proportion of lactulose is concentrated in vacuum to 75% w./w. After several days standing this solution can be sucked off from another lactose crystallisate. The resulting colourless and sweet tasting syrup has a specific rotation $$[\alpha]_D^{20} = -21.0°$$

and contains in dry solid form approximately 60% lactulose, 15% galactose and 10% lactose. The remainder are several other sugars not identified.

Yield: 580 g. of 70% syrup corresponding to 405 g. dry solids.

No crystallized lactulose can be extracted from the mixture in accordance with conventional methods.

(b) Separation and purification of the lactulose.—3 liters of cation exchange resin Imac C 16 P (a highly acidic porous polystyrene resin having a particle size of 0.3–1.2 mm., with free SO₃H groups, supplied by Messrs. Imacti, Amsterdam) in the form of the sodium salt are introduced in equal parts into 2 glass tubes each of 33 mm. bore and 2 m. long and connected together. They are treated with a solution of 1.46 kg. (=18 mol) of primary hydrazine-sulphate in 10 liters of water and then washed free of hydrazine with water. The amount of hydrazine taken up amounts to 2.1 mol of hydrazine per liter of resin in the beds. By concentrating the regeneration liquid and adding a large amount of sulphuric acid, the hydrazine added in excess can be extracted as a sparingly soluble secondary sulphate.

The columns are now heated to a temperature of 40° C. by a heating jacket. Similarly as in Example 1, 360 milliliters of the lactulose concentrate diluted to 36% w./w. (=42% w./v.) are added at 15.5 ml./min. and then washed with water at the same rate. A sugar-free forerun of 1500 ml. is obtained first. Then fractions of 150 ml. are obtained, and the sugars determined with the following results:

| Fraction No. | Ml. | Total amount of sugar, percent w./v. | $[\alpha]$ |
| --- | --- | --- | --- |
| 1 | 150 | 7.4 | −37.4 |
| 2 | 150 | 18.3 | −38.5 |
| 3 | 150 | 23.8 | −39.8 |
| 4 | 150 | 15.2 | −40.1 |
| 5 | 150 | 7.4 | −35.3 |
| 6 | 150 | 4.0 | −25.0 |
| 7 | 150 | 2.4 | −19.1 |
| 8 | 150 | 1.6 | 0 |
| 9 | 150 | 1.1 | 0 |
| 10 | 150 | 0.9 | 0 |
| 11 | 150 | 0.9 | 0 |
| 12 | 500 | 0.7 | +35.0 |
| 13 | 500 | 0.6 | +44.0 |
| 14 | 500 | 0.4 | +70.0 |
| 15 | 500 | 0.3 | +76.0 |

Fractions 1 to 5 contain the bulk of the added lactulose. They are concentrated together to a thick syrup and taken up in hot methanol to a total volume of 250 ml. After inoculation, lactulose crystallizes abundantly from this solution as a colorless heavy granular crystallisate, with a yield of 62.5 g. (corresponding to approximately 70% of the lactulose employed).

After recrystallization from aqueous methanol 54.6 g. of pure lactulose $[\alpha]_D^{20} = -51.2°$ (c.=10, water) are obtained. By further crystallization from the mother liquors of the first and second crystallizations another 9.7 g. of a less pure product are obtained. Fractions 6 to 15 which contain only a small amount of lactulose with an incompletely separated mixture of other sugars, are rejected or put to another technical use.

Example 7.—The separation of glucose and fructose from invert-sugar at a phenol resin-cation exchange charged with hydrazine and $H^+$ Following the procedure of Example 5, 3 liters of cation exchange resin Duolite C 10 (a porous strongly acid phenol resin, having as the active groups: $-CH_2SO_3H$, with a particle size of 0.3–2 mm., and a total capacity: 0.6 mval./ml., humid) are brought to the $H^+$ form by regeneration with hydrochloric acid and the neutral washed resin is stirred with a solution of 48 g. (=1.5 mol) hydrazine in approximately 5 liters of water. The charged resin contains 0.5 mmol. hydrazine and 0.1 mmol. $H^+$/ml.

The column is filled as in Example 5, and heated to 40° C. with 250 ml. invert sugar solution 50% g./g. (=62% g./v.) at a rate of 15.5 ml./min. and then washed with water with the same rate. After a sugar-free forerun of 1900 ml., fractions of 150 ml. are obtained. From fractions 1–6, which contain the greatest quantity of fructose, 44.3 g. of pure fructose, are concentrated and crystallized from methanol, as in Example 1. 56.7 g. of pure glucose are obtained from fractions 7–19.

Example 8.—The separation of glucose and fructose from sulfonated pit coal resin charged wth hydrazine and $H^+$ Following the procedure of Example 5, three liters of cation exchange resin Dusarit S (strongly acidic sulfonated pit coal, containing as the active groups: $SO_3H$ and OH, having a particle size of 0.3–1.2 mm., and a total capacity: strongly acidic 0.7 mval./ml., weakly acidic 0.35 mval./ml., wet) are regenerated with hydrochloric acid into the $H^+$ form. The resin is washed neutral and mixed with a solution of 48 g. (=1.5 mol) of hydrazine in about 5 liters of water. The charged resin contains 0.5 mmol. hydrazine and 0.2 mval. strongly acid $H^+$/ml.

Using the same procedure as in Example 7, it is subjected to chromatography and after a sugar-free forerun of 2150 ml., the first seven fractions of 150 ml. each yield a total of 47.6 g. of pure fructose. Fractions 8–26 yield a total of about 58.2 g. of pure glucose.

Example 9.—Separation of glucose and fructose from invert sugar using a phosphoric acid-cation exchange resin charged with hydrazine and $H^+$ Following the procedure of Example 5, 3 liters of cation exchanger Duolite ES–64 (a medium acidic polystyrene-resin, having as the active group: $PO_3H_2$, a particle size of 0.3–1.2 mm., and a total capacity of 3.3 mval./ml., moist) are regenerated with hydrochloric acid to the $H^+$ form. The resin is washed neutral and mixed with a solution of 144 g. (=4.5 mol) of hydrazine in about 5 liters of water. The charged resin contains 1.5 mmol. hydrazine and 1.8 mval. $H^+$/ml.

Using the same column as in Example 5, 500 ml. of invert sugar solution 50% g./g. (=62% g./v.) are applied and elutriated with water. After a sugar-free run of 1750 ml. fractions of 150 ml. were obtained. The main quantity of fructose was found in fractions 1–7, and the glucose in fractions 8–25. After evaporation of each fraction and absorption in methanol, 92.6 g. of pure fructose and 109.2 of pure glucose are obtained.

The sugar solutions may be in the form of their water solutions as illustrated, or may be in the form of water-alcohol solutions, such as a methanol-water solution. The process satisfactorily separates different sugars including those having relatively small differences in their hydrolytic stability constant. The individual sugars are separated in the different fractions in pure form, or in fractions which are substantially enriched in one of the sugars and which may more readily be utilized to produce a pure sugar than the original mixture. The sugars are obtained substantially free of impurities since the cation exchange resins utilized are insoluble. As illustrated in the examples, the wash fractions contain the sugar in relatively concentrated solutions from which it is readily crystallized by conventional procedures without requiring subsequent purifying operations.

The process of the present invention is superior to the known processes. High yields and good separations are obtained and require only relatively short columns and small volumes of fluid. The separation is approximately six times better than that which is attained using known processes, under comparable conditions.

While the principles of this invention have been disclosed in connection with several different embodiments, it will be understood that these embodiments are given by way of example only and not as limiting the scope of the invention set forth in the appended claims.

What is claimed is:

1. A process for the separation of different sugars from a mixture thereof, comprising reacting a cation exchange resin with hydrazine, and then contacting an aqueous or an aqueous-alcoholic solution of said mixture of sugars with the hydrazine-containing exchange resin whereby the sugars become bonded to the resin, and then washing the sugar-containing resin to fractionate the sugars and obtain the individual sugars present in said sugar mixture in the different fractions.

2. The process of claim 1 wherein an aqueous solution of the mixture of sugars is contacted with the hydrazine-containing exchange resin, and wherein water is used to wash the sugar-containing resin thereby fractionating the sugars.

3. The process of claim 2 wherein the cation exchange resin contains active sulfate or phosphoric acid groups.

4. The process of claim 3 wherein the cation exchange resin is a phenolic resin or a polystyrene resin.

5. The process of claim 4 wherein the hydrazine-loaded cation exchange resin contains substantially equal molar amounts of hydrazine and of hydrogen ions.

6. The process of claim 5 wherein the mixture of sugars treated is invert sugar.

7. The process of claim 6 wherein the separation process is carried out at a temperature between 40° C. and 80° C.

8. The process of claim 7 wherein the hydrazine-loaded cation exchange resin is contained in a column, and wherein said resin contains active sulfate groups.

9. The process of claim 7 wherein the hydrazine-containing cation exchange resin is contained in a column, and wherein the cationic group of said exchange resin is a phosphoric acid group.

10. The process of claim 8 wherein the separation process is carried out at a temperature of about 65° C.

References Cited

UNITED STATES PATENTS

| | | | |
|---|---|---|---|
| 2,259,503 | 10/1941 | Wassenegger et al. | 210—38 X |
| 2,818,851 | 1/1958 | Khym et al. | 127—46 X |
| 2,937,959 | 5/1960 | Reents et al. | 127—46 |
| 3,044,904 | 7/1962 | Serbia | 127—46 |

OTHER REFERENCES

Vekhotko et al.: "Selection of oxidation-reduction systems for the production of oxidation-reduction in exchangers," Chem. Absts., 56:9677i (1962).

Vekhotko: "Simultaneous softening and deoxygenation of water by the hydrazine cation-exchange method," Chem. Absts., 57:12266g (1962).

MORRIS O. WOLK, Primary Examiner

D. G. CONLIN, Assistant Examiner

U.S. Cl. X.R.

210—38